Jan. 25, 1966  E. F. COX  3,230,832
APPARATUS AND PROCESS FOR MACHINING RAILS
Filed Sept. 12, 1963  7 Sheets-Sheet 1
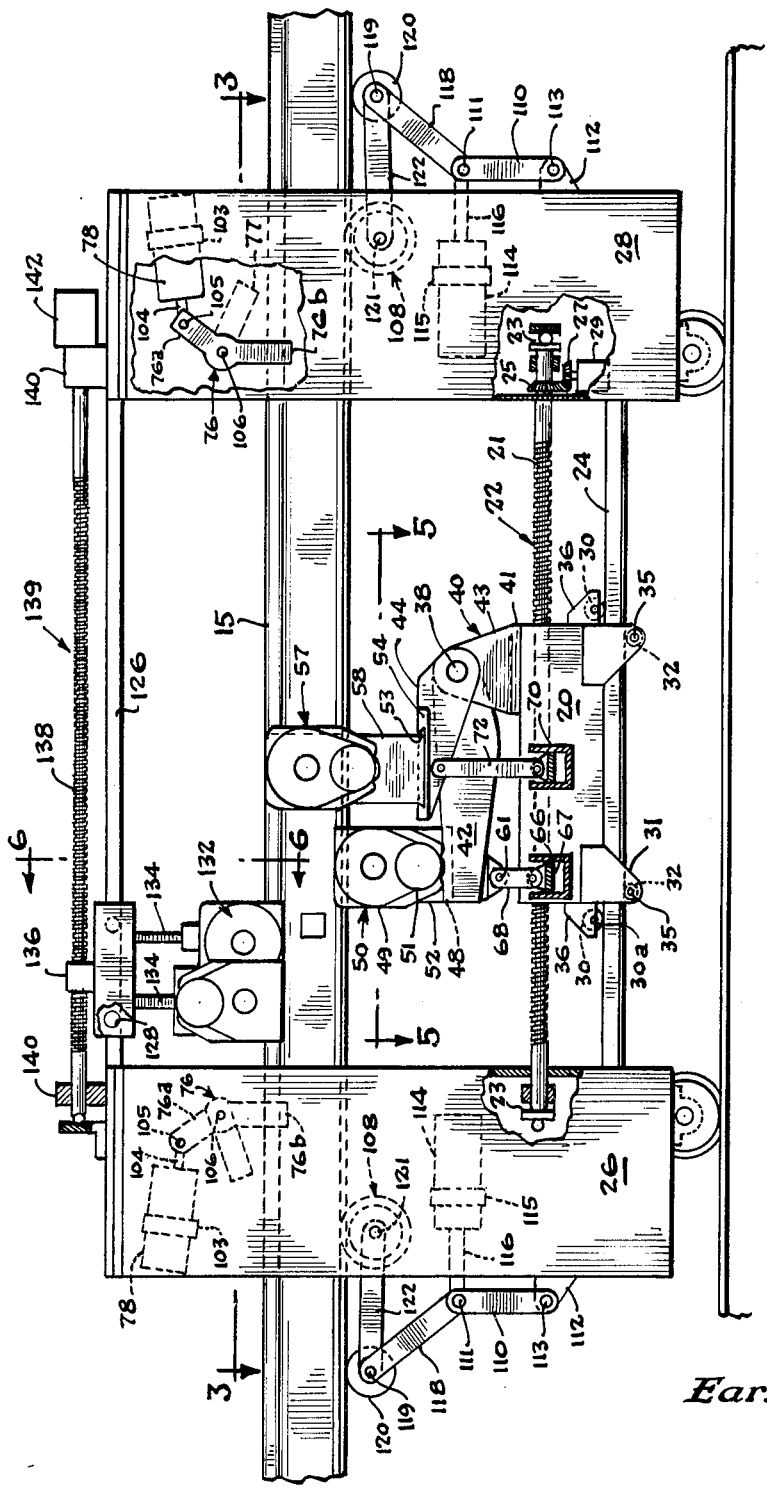
INVENTOR.
*Earle F. Cox*

Jan. 25, 1966 E. F. COX 3,230,832
APPARATUS AND PROCESS FOR MACHINING RAILS
Filed Sept. 12, 1963 7 Sheets-Sheet 2

Jan. 25, 1966  E. F. COX  3,230,832
APPARATUS AND PROCESS FOR MACHINING RAILS
Filed Sept. 12, 1963  7 Sheets-Sheet 3
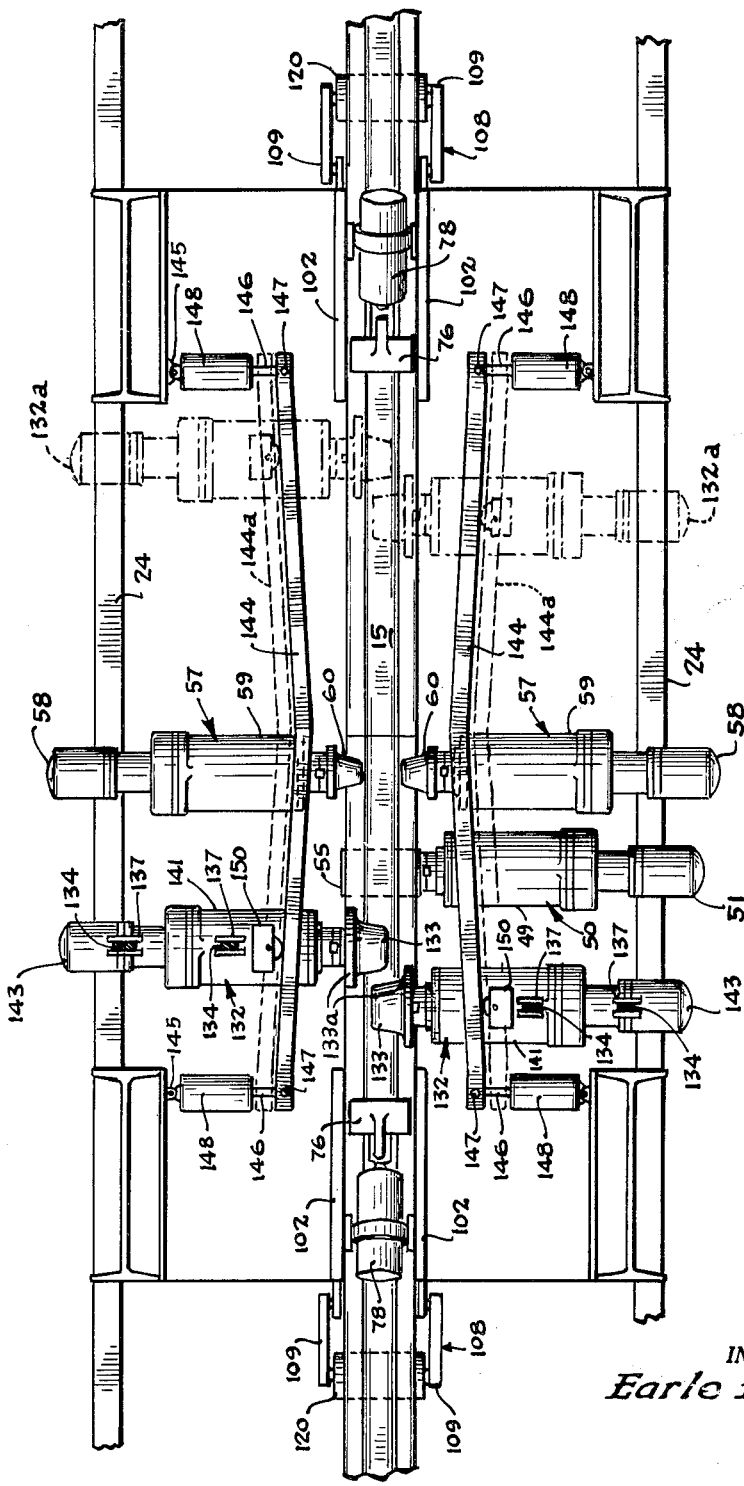
INVENTOR.
*Earle F. Cox*

Jan. 25, 1966  E. F. COX  3,230,832
APPARATUS AND PROCESS FOR MACHINING RAILS
Filed Sept. 12, 1963  7 Sheets-Sheet 4

INVENTOR.
Earle F. Cox

Jan. 25, 1966   E. F. COX   3,230,832
APPARATUS AND PROCESS FOR MACHINING RAILS
Filed Sept. 12, 1963   7 Sheets-Sheet 5
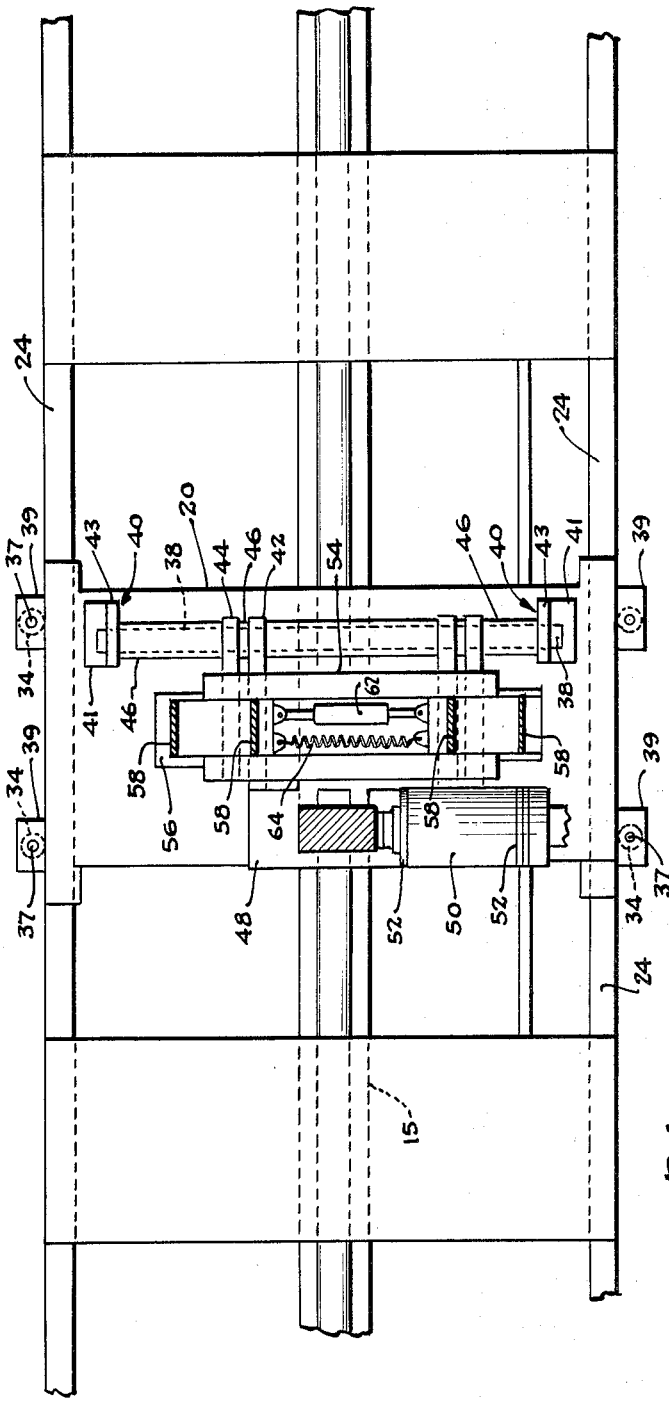
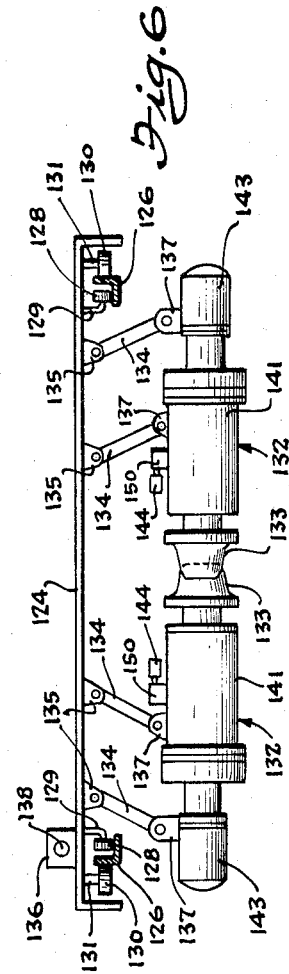
INVENTOR.
*Earle F. Cox*

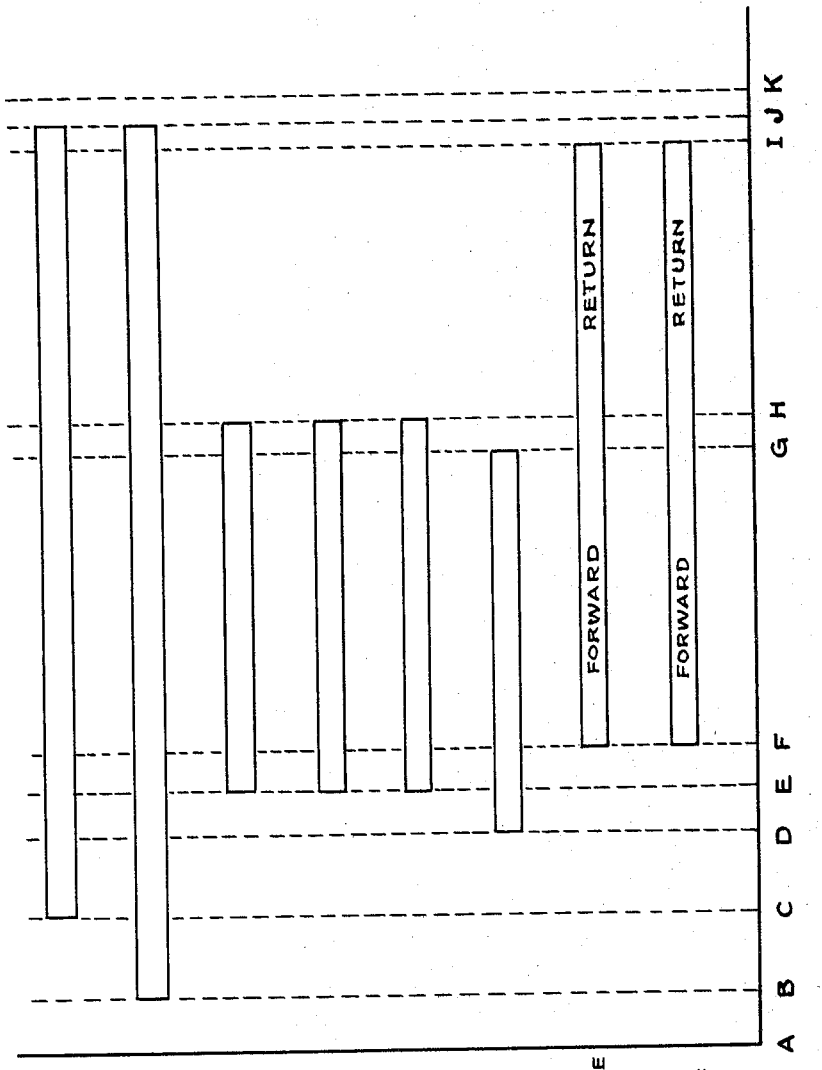

INVENTOR.
Earle F. Cox

United States Patent Office 3,230,832
Patented Jan. 25, 1966

3,230,832
APPARATUS AND PROCESS FOR
MACHINING RAILS
Earle F. Cox, Birmingham, Mich., assignor to Chemetron Corporation, Chicago, Ill., a corporation of Delaware
Filed Sept. 12, 1963, Ser. No. 308,539
20 Claims. (Cl. 90—11)

The present invention relates to an improved mechanism and process for removing flash from welded rails. The mechanism is adapted to receive a welded railroad rail immediately after welding thereof into continuous lengths and to remove the weld flash therefrom automatically and in a fashion providing a rail, when cooled, that is flash-free and smooth for railroad use.

This application is a continuation-in-part of my copending United States patent application Serial No. 143-960, filed October 9, 1961, now abandoned.

Flash removal from the joints of welded rails is complicated by several factors. One of these factors is the need to coordinate flash removal with the welding operation, effecting the removal within specific and predetermined time limits allowing continuous operation of the welding device. Another complication arises out of the fact that flash removal is accomplished while the welded area of the rail is still at elevated temperatures. At these temperatures the flash must be removed while the rail is in the bowed condition to achieve an efficient continuous operation. The terms "bowed," "convexed," "domed," and "curved" are employed interchangeably throughout this application to designate a rail which, due to unequal cooling throughout the cross-section of the rail, is bent in a vertical plane through a rail. It will be appreciated that if a straight cut were made on the uncorrected surfaces while the rail is in this exaggerated domed condition, the cooled rail surface would have a marked and distinct depression thereon. The resultant rail surface at the joints would be unsatisfactory and unacceptable for use. Another feature of the process which gives rise to considerable difficulty and which complicates the removal of flash from the rail joints is that the rail joints are often welded with the adjoining rail heads in various types of misalignment. It should be appreciated that it would not be feasible of conducive to rapid, efficient operation to assure that the juxtaposed ends of the mating rails to be joined by welding be perfectly aligned both vertically and horizontally each time a weld is performed. In the welding process, therefore, the rail ends are usually alnged in an approximate fashion. It should be noted that the adjoining rail ends may be vertically offset from each other or they may be horizontally offset. Conditions may also arise wherein one rail or end is wider than the adjoining end, or the centerlines of the abutting rail ends may not be coaxially aligned even though one side of the rail head may be flush with the mating side of the adjoining rail head. All of the above noted variations are of the type that may normally be encountered in the welding of rails. Such variations and undesirable rail joint conditions must be corrected before the rail can be considered satisfactory for service.

In one method of welding railroad rails, described in my Patent 2,911,516, entitled "Welding Machine for Rails or the Like" and issued on November 3, 1959, the rails are brought to abutting relation, a heavy electric current is passed therethrough to heat the abutting rail faces to malleable weldable temperature, the rails are struck together by end forces to form a full seating engagement of one rail against the other in the region defined by heated malleable rail metal, and the rails are thereafter held in abutting relation under pressure until the rail joint has cooled sufficiently to form a solid joint. Machinery effective for performing this process is disclosed and claimed in my Patent 2,911,516, above identified.

The welded rail produced as above described is characterized by considerable flash about the rail joint. This flash is created by the upset metal that is forced outboard or outwardly of the welded interface under the impact of the repeated application of end forces and the longitudinal pressure applied to the rails. Unless removed, this flash causes a bump in the rail when installed and, in addition, interferes with the effective installation of the rail to form a railroad track.

The flash removal machine is capable of automatic operation that can be utilized in conjunction with present day automatic rail welding machines. Briefly, the rail is fed to a flash removal unit while still hot, it is clamped therein, torque is applied to flex the rail to a preselected degree of convexity, the flash removing tools are moved to operating position, the tools are energized and swept over the surfaces to be machined, the tools are retracted, and the rail released.

It is a purpose of the invention to provide an improved rail conditioning machine having means for changing the domed condition of the rail to a preselected degree of convexity and in particular to increase the domed condition of an insufficiently convexed rail within the machine to position the rail in a preselected optimum position with respect to flash removing means.

FIGURE 1 is a side elevation of the flash removal machine showing a rail positioned therein and with the rail clamps and cutters in operative position;

FIGURE 2 is a top plan view taken from directly above the machie showing in particular detail the guide cams and associated mechanism provided for the top cutters;

FIGURE 5 is a partly sectioned horizontal view taken through lines 5—5 of FIGURE 1, showing a detail the side cutter support and positioning mechanism;

FIGURE 6 is a vertical partly sectioned view taken along lines 6—6 of FIGURE 1 showing only the top cutters with their associated carriage and support mechanism;

FIGURE 7 is a bar graph illustrating the timed sequence of the automatic control device for the flash removal machine;

General description

Figure 1A:
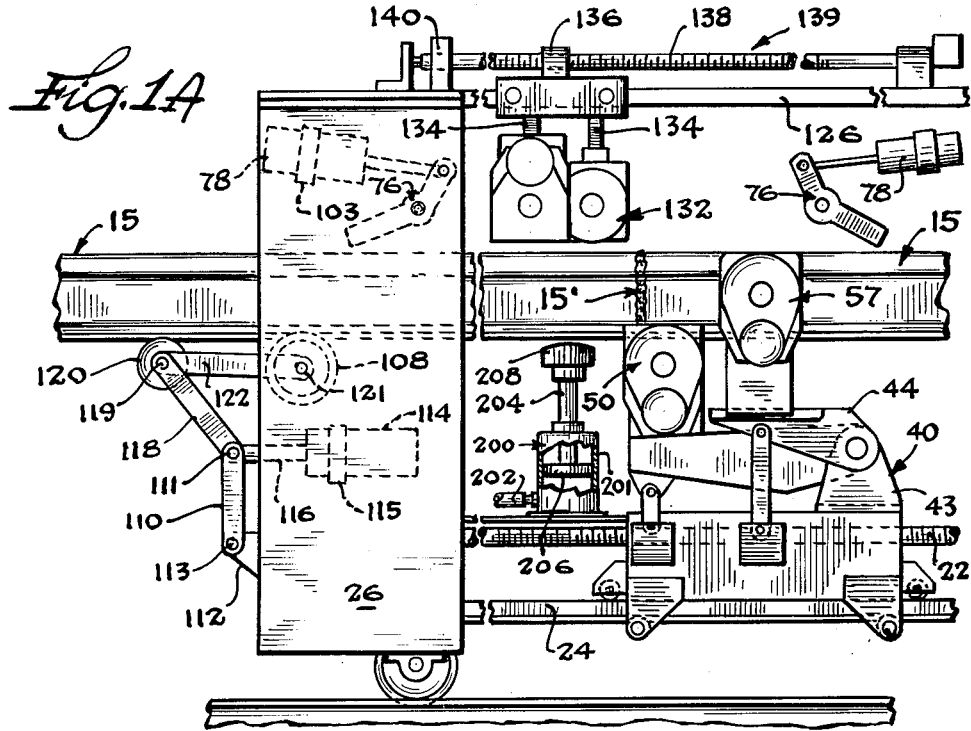
FIGURE 1A is a fragmentary side elevational view of the rail conditioning machine of FIGURE 1 illustrating in addition force-producing elements which are employed to increase the convexity of the rail, with the force-producing elements shown in their inoperative positions.

In the apparatus of the present invention the rail is introduced into the flash removal machine through suitable rail transporting devices (not shown). The rail is positioned within the machine with the welded rail joint within reasonable proximity of the center of the machine. Positioning of the rail joint with relation to the machine, however, is not critical since the machine itself is movable upon its own base structure and carriage to permit final positioning of the machine with respect to the welded rail joint.

The frame of the machine is comprised of four vertical end columns suitably journalled on the axles of spaced carriage means. A second carriage is movably supported on rails mounted on the frame members and supports the undercutter and side cutter mechanisms.

The rail undercutter and side cutter mechanisms are vertically movably supported on the second carriage means so that they may be disposed into and out of rail engaging position.

It will be appreciated that when the rail is introduced into the rail conditioning machine for conditioning it is still very hot from the previous welding operation and thus may be in a domed condition due to thermal expansion of the hot metal within the welded joint area or previous alignment during the formation of the weld, or both. The bowing or doming is progressively greater in degree at progressively shorter distances from the rail joint, with the maximum bowing or curvature at the rail joint. It should also be noted that the abutting welded rail heads often are not perfectly aligned so that there will be some degree of vertical or horizontal, or both, offset of one rail head with respect to the abutting rail head. If the rail is in a considerably domed condition, the curvature may be compensated for by flexing the rail by appropriate means to a reference curvature to assure proper conditioning of the rail joint area so that a smoothly tapering finished rail surface is provided. To this end the machine is provided with vertical clamp dogs which are brought down on the rail head to secure the rail and, in combination with flexing rolls, to flex the domed rail downwardly to a lesser domed condition. The vertical clamp dogs are positioned near the ends of the flash removing machine.

The rail is supported near the ends of the rail conditioning machine by support rolls. A flexing roll is provided as part of the associated support mechanism for the rail. The flexing roll, through its associated mechanism, acts in vertical force opposition to the vertical clamping dogs. The opposed forces exerted upon the rail by the vertical clamping dogs and the flexing rolls is effective to produce a couple at each clamped end of the rail which flexes the rail to a preselected reference convexed condition suitable for the subsequent surface machining operation.

Some rails, however, may not be in the domed condition referred to hereinabove. As noted, the passage of the rail cutters over the rail surfaces occurs along a preselected path with respect to the machine. To this extent it is essential that the rail be positioned in a specific predetermined path within the rail conditioning machine. In order to provide the preselected degree of curvature to some of the rails that are in a relatively straight condition, it is necessary to elevate the rail until it comes into contact with the vertical clamping dogs recited hereinabove and described in detail hereinafter. A lower vertical rail positioning means is provided to elevate rails as required in the processing thereof in the rail conditioning machine.

Figure 3:
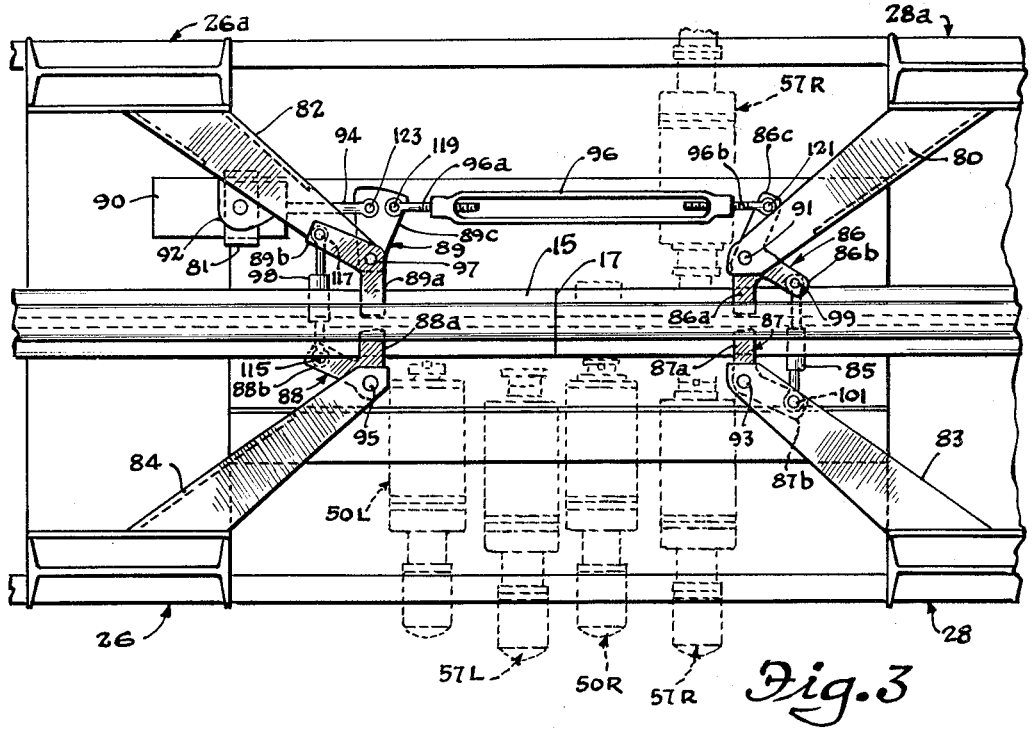
FIGURE 3 is a horizontal section taken through 3—3 of FIGURE 1, showing the rail side clamp mechanism in detail.

The lateral clamps, generally shown in FIGURE 3, are positioned with respect to the rail web and establish the proper longitudinal reference of the rail with respect to the milling heads of the flash removal machine. It is the function of the lateral clamping mechanism to bring the rail section within the machine to a position on or near the longitudinal axis of the flash removal machine regardless of the nature or amount of lateral misalignment of the rail as it enters the machine.

In accordance with the invention, the flash is removed from the rail joint, for example by the use of machining elements.

Once the rail is positioned and clamped within the machine by the vertical and lateral clamping mechanism the under cutter and side cutters are lifted into operative position at this point. The machining elements may be brought to operating positions in relation to the rail from their respective retracted positions by hand operation of the respective positioning elements or of the control mechanisms therefor. In the alternative, automatic positioning mechanisms may be used, such as feeler-controlled mechanisms for the respective machining elements that, when actuated, move the respective machining elements towards the rail until the feeler senses the proper spacing in relation to the rail and holds the machining elements in such position.

The cutters, or machining elements, when positioned, are energized and the flash removal process initiated. Traversing means are associated with the machining elements to pass the elements across the rail joint. Suitable switching means may be employed to de-energize the drive mechanism when the weld area has been traversed by the elements and to return the cutters to their initial position.

The top cutters are guided for lateral movement by guide cam members such that a smoothly proportioned cut is made on the top and side portions of the rail head. The cam means of the present invention is essential for effective flash removal. Without some such guide means flash removal would not be effected in the proper fashion. Sharp indentations or offsets in the rail cannot be tolerated since the rails are subject to rather large intermittent stresses and the stress risers that would be present due to a cut that was not properly blended would lead to early failure of the welded joint and would necessitate an expensive field repair.

When the cutters have traversed the weld joint area, and cease to cut, they are de-energized simultaneously with the drive mechanism. The cutters are then withdrawn to a retracted position and returned to the initial positions. The rail clamping means are then released and the rail is removed from the machine.

Detailed Description

When the welded rail joint area is introduced into the flash removal machine, the joint 15, is still substantially at welding temperatures. In this condition, the hot rail joint may be in a domed condition. It is essential that the welded rail joint be flexed to a preselected reference curvture to assure proper conditioning of the rail joint area. It should also be noted that at this pont the welded, abutting rail heads may be offset with respect to each other. The only correction that can be realized for such misalignment, however, lies in the proper positioning of the machining elements with respect to the rail surface and in the proper blending in the cutting or surface removal operation adjacent the joints to assure a smooth, suitably finished rail surface at the rail joint.

Figure 4:
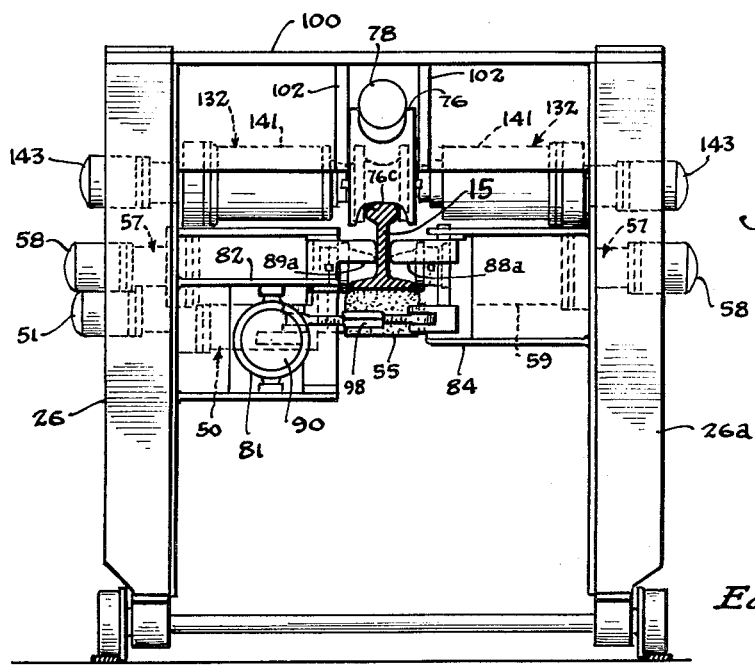
FIGURE 4 is an end view of the flash removal machine showing only the top rail clamps and rail cutting devices.

A domed longitudinally extending rail is vertically positioned within the rail conditioning machine through the vertical clamp dogs 76, shown in FIGURES 1 and 4, and their associated mechanisms.

The support member for the vertical clamping mechanism is comprised of a horizontal support bar 100 rigidly attached to the upper face of the vertical support columns 28 and 28a, and 26 and 26a, as shown. The support bar 100 has subtending, spaced arms 102 rigidly attached by means of a trunnion mounting 103 to each pair of support arms 102 in the space between said arms. The connecting rod 104 of the cylinder-piston unit 78 is pivotally attached by a pin 105 to one arm 76a of the dog 76 to effect movement of the dog 76 into and out of operating position. Each of the vertical clamp dogs 76 is pivotally attached to the spaced arms 102 by means of a pin 106, as shown generally in FIGURE 1.

The vertical clamp dogs 76 are each comprised of two integral, angularly related arms 76a and 76b, as indicated in FIGURE 1. As shown in the cutaway section of vertical column 28 in FIGURE 1, the dog 76 is urged into operating position upon application of fluid pressure to the cylinder-piston unit 78. Operating position, in this instance, occurs when the piston of the cylinder-piston unit 78 is fully retracted. Application of fluid pressure to the unit 78 to urge the piston thereof to its extended position will urge the dog 76 to assume the position shown by the dashed lines 77 in the cutway section of FIGURE 1, at which time the dog 76, as shown, is retracted from the rail head.

The lower rail engaging face 76c of the dogs 76, as shown in FIGURE 4, is of generally concave configuration. This configuration is more suitable for gripping and positioning of the rail head within the machine.

If the rail is not in suitably bowed or domed condition with respect to the path traversed by the rail cutters in operation of the machine, it is essential that the rail be flexed upwardly until the upper rail face engages the dogs 76 of the conditioning machine.

Figure 1B:
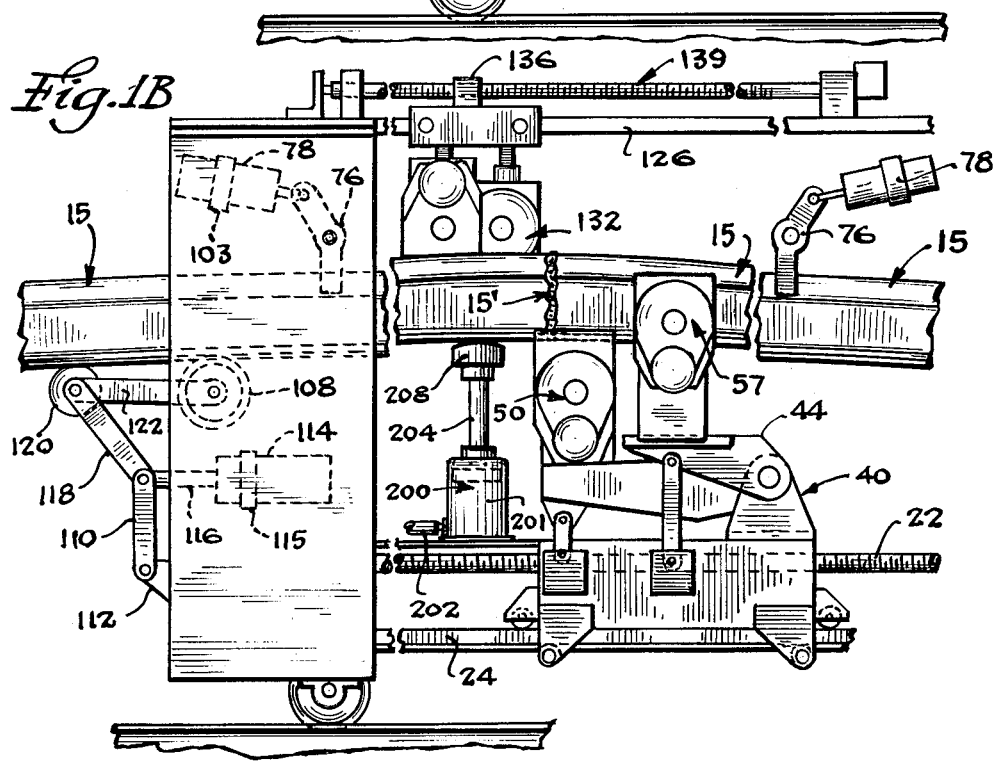
FIGURE 1B is a fragmentary side elevational view similar to FIGURE 1A but showing the force-producing elements in their operative positions with the rail flexed to a greater degree of convexity than shown in FIGURE 1A.

A fragmentary view of the rail conditioning machine of FIGURE 1 is shown in FIGURES 1A and 1B of the drawings to illustrate that the conditioning machine is capable of flexing the rail upwardly toward the predetermined rail curvature required for optimum conditioning of the rails. As indicated in FIGURES 1A and 1B, a force-producing element or device indicated generally at 200 is mounted on the base of the support bed of the rail conditioning machine in any suitable manner. The mounting and support must be adequate to resist the reaction forces encountered in elevating the rail 15 during the rail positioning process. The force-producing device 200 includes a cylinder 201, with a fluid inlet hose 202 communicating with the interior of the cylinder 201. The free end of the hose is connected to a suitable source of working fluid (not shown) such as air or oil. One end of a piston rod 204 extends into the cylinder 201 and is affixed to a piston head 206 within the cylinder 200 to be raised or lowered in accord with the raising or lowering of the piston head 206. The other end of the piston rod 204 is affixed to a load-carrying head 208, engageable with the rail to flex the rail 15. The cylinder 201 is in the static position in FIGURE 1A wherein it is not acting upon the base of the rail 15. The cylinder 201 of course is not employed during weld flash removal from a highly domed rail that must be urged to a lesser convex condition through the dogs 76 and flexing rolls 120. However, if the rail is not sufficiently domed to present the proper reference curvature within the rail conditioning machine, then the cylinder 201 is employed to flex the rail about the rail joint area within the rail conditioning machine to bring it to the proper reference curvature.

In the latter case working fluid is introduced to the cylinder 201 below the piston head 206 to elevate the head piston 206 and therethrough the piston rod 204 and the head 208. The head 208 engages the base of the rail 15 at a relatively short distance from the rail joint and upon continued introduction of working fluid to the cylinder 201 will cause the rail 15 to be elevated until it is brought into contact with the dogs 76 of the vertical positioning means. Since the head 208 of the force-producing device 200 can exert a force on the rail at a relatively short distance from the rail joint 15, the maximum bowing or convexity is substantially at the rail joint 15. The extensible length of the piston rod 204 can be gauged such that it will be sufficient only to urge the rail into contact with the dogs 76 and then to hold the rail in that position during traverse of the rail cutters over the rail joint area to condition the same. The flexing action caused by the cylinder operation is illustrated in FIGURE 1B of the drawings wherein the rail 15 is shown in slightly flexed relation and disposed in the proper machine reference curvature for conditioning of the rail joint. It should be observed that cylinder 201 is disposed on the opposite side of the cutters longitudinally of the machine, substantially intermediate or inwardly of the dogs 76 to deflect the rail vertically upward. The cylinder 200 can be interconnected to the same working fluid supply and operated in unison to flex the rail uniformly. It is to be understood that two force-producing devices such as 200 are employable. These two force-producing devices would straddle the rail joint 15 and would cause the maximum bowing or curvature of the rail 15 to exist directly at the rail joint 15'.

The rail 15 is supported near the ends of the flash removal machine by support rolls 108, as shown generally in FIGURE 1.

The support rolls 108 are supported and positioned by support mechanism which is comprised of an arm 110 pivotally connecetd at one end thereof to a bracket 112 by a pivot pn 113. The bracket 112 is rigidly attached to a horizontal support bar (not shown) which support bar is rigidly attached to the vertical end columns at each end of the machine. A cylinder-piston assembly 114 is pivotally attached to the vertical end columns by means of a suitable trunnion mounting 115. The connecting rod 116 of the cylinder-piston assembly 114 is pivotally attached to the other end of the arm 110 by a pin 111. A second support arm 118 is pivotally connected at one end to the connecting rod 116 and arm 110 by pin 111, which pin extends through both arms and the connecting rod. Support arm 118 is pivotally connected at its other end to the axial pin 119 of the flexing roll 120. Arm 122 is provided to interconnect the flexing roll 120 and the support roll 108 at each end thereof, the arm being pivotally supported at one end of the axial pin 119 of the flexing roll 120 and at the other end by the axial pin 121 of support roll 108. Pin 121 is vertically adjustable but, once set, it is not changed as successive units are handled.

The support roll 108 is provided wth flanges 109 thereon at its end to guidingly receive the base of the rail 15 as well as to support said rail.

The vertical position of the flexing roll 120 in relation to the base of the rail 15 is controlled by the cylinder-piston assembly 114. It will be observed that the piston of the cylinder-piston unit 114 is shown in the fully extended position in FIGURE 1, in which position the flexing roll 120 is acting in the greatest vertical force opposition to the downward force on the rail 15 of the subtending dogs 76. To withdraw the flexing roll 120 from contact with the rail base, fluid pressure is introduced into the cylinder-piston assembly 114 to urge the piston and connecting rod 116 to their fully retracted positions. The cylinder-piston unit 114 may be positioned at any point intermediate the fully retracted and fully extended positions. Proper positioning and clamping of the welded rail joint within the flash removal machine is essential for satisfactory removal of weld flash from the rail surface. To position the domed rail joint area in the proper vertical alignment for the subsequent machining operation the dogs 76 are first placed in operative or rail engaging position ready to matingly receive the rail head of the rail 15. The rail is then lifted from the support rolls 108 by the flexing rolls 120. The flexing rolls 120 are operated through the cylinder-piston unit 114 and the interconnecting linkage 116 and 118. With an automatic control device the flow of oil is automatically controlled through an appropriate feedback mechanism. The flexing rolls 120 are urged vertically upwardly in vertical force opposition to the subtending dogs 76 to place a steadily increasing coupling force upon the rail section within the flash removal machine to flex the rail vertically downwardly toward the proper reference curvature. It should be noted that the rail head initially is resting upon the support rolls 108 within the flash removal machine. Normally, the rail engaging face 76c of the dog 76 will not engage the rail head when in operative position, as described above and as illustrated in FIGURE 1, without the rail being lifted off of the support rolls 108 by the flexing rolls 120. The flexing rolls 120 lift the rail from the support rolls 108 vertically upwardly until the rail head engages the second of the rail engaging faces 76c of the subtending dogs 76. The flexing rolls 120 continue to lift the rail upwardly after engagement with the second dog until a preselected point defining the desired condition of flex is reached at which time the fluid powered rail lifting control motors are shut off and the rail clamped in this position. The pin 111 upon which the arm 110, connecting rod 116, and support arm 118 are pivoted, acts as a floating pivot. The floating pivot 111 is moved towards the cylinder-piston assembly 114 when the piston of the cylinder-piston assembly 114 is fully retracted. Under this action the support arm 118 to the left of the machine as shown in FIGURE 1 is rotated in a counter-clockwise direction to thereby rotate the flexing roll 120 out of engagement with the rail base to release the upward force exerted by the roll 120 upon the base rail. The support arm 118, to the right of the machine as shown in FIGURE 1, is rotated in a clockwise direction when the piston of the cylinder-piston assembly 114 is withdrawn to thereby move the flexing roll 120 out of engagement with the rail base.

It should be noted that in the event that the rail is not sufficiently domed to dispose it in the preselected curvature in operation of the machine in the above described manner, then the cylinder 201 is employed to elevate the rail section into engagement with the dogs 76 of the rail conditioning machine. In this event, the flexing couple placed upon the rail is in mirror opposition to that defined hereinabove. The force opposition member is now substantially intermediate or inward of the dogs and the resultant couple upon the rail would urge the rail section upwardly instead of downwardly as defined hereinabove.

The rail is laterally and longitudinally positioned with reference to the machine, by lateral clamps, shown generally in FIGURE 3. Support arms 80, 82, 83 and 84 for the lateral clamps are each rigidly attached at their bases to the vertical end columns 28a, 26a, 28 and 26, respectively. The arms 80, 82, 83 and 84 project inwardly from the vertical end columns toward the center of the flash removal machine, thus being angularly positioned with respect to the vertical ends columns 28a, 26a, 28 and 26, respectively.

Lateral rail engaging clamp members, indicated generally at 86, 87, 88 and 89 are pivotally attached by pins 91, 93, 95 and 97 to the inner terminal ends of the support arms 80, 82, 83 and 84, respectively.

Lateral clamp member 86 is comprised of two integrally joined V-shaped arms 87a and 87b. A longitudinally adjustable turnbuckle 85 is pivotally connected at one end thereof to arm 86b of clamp member 86 by a pin 99 and at the other end to arm 87b of clamp member 87 by pin 101.

Lateral clamp member 88 is comprised of two integrally related, generally V-shaped arms 88a and 88b. Clamp member 89 is comprised of three integrally joined, angularly related arms 89a, 89b and 89c, as shown in FIGURE 3. A longitudinally adjustable turnbuckle 98 is pivotally connected at one end thereof to arm 88b of clamp member 88 by pin 115 and at the other end to arm 89b of clamp member 89 by pin 117.

The adjusting rod 96a of turnbuckle 96 is pivotally connected by pin 119 to the arm 89c of clamp member 89. Adjusting rod 96b of turnbuckle 96 is pivotally connected by pin 121 to arm 86c of clamp member 86.

A cylinder-piston unit 90 is rigidly attached to the support arm 82 by means of attaching the cylinder-piston holding clamp 81 to the boss 92. Boss 92 is integrally joined to the arm 82. The connecting rod 94 of the cylinder-piston unit 90 is pivotally connected to arm 89c of clamp member 89 by a pin 123.

The lateral rail clamping means is operated by the cylinder-piston unit 90. Fluid pressure is introduced to the cylinder-piston unit 90 to urge the piston therein to its fully extended position. This action will cause the clamp member 89 to rotate about pin 97 in a clockwise direction. Clockwise rotation of member 89 urges arm 89a of said member into engagement with the web of the rail 15. The clockwise rotation of arm 89b of clamp member 89, through the turnbuckle 98, urges clamp member 88 to rotate in a clockwise direction about pin 95 to thereby urge arm 88a into engagement with the web of the rail 15.

Rotation of the clamp member 89 serves to effect a rotation of the clamp member 86 in a similar direction through the complementary action of the interconnecting turnbuckle 96. In this instance, clockwise rotation of member 86 serves to bring the arm 86a thereof into rail engaging position. Clockwise rotation of the clamp member 86, and its integrally joined arm 86b, urges the turnbuckle 85 and, therethrough, the clamp member 87 to rotate in a similar direction about pin 93. Clockwise rotation of member 87 serves to bring arm 87a thereof into rail engaging position. The longitudinally spaced pairs of rail engaging arms 86a, 87a, 88a and 89a, when in rail engaging position, coact to position the rail in a standard longitudinal reference position within the flash removal machine. Therefore, regardless of the nature or amount of lateral misalignment of the rail within the machine the lateral clamping means will bring the rail section to a position equidistant from the centerline of the machine itself.

The general condition of the rail as it may appear before, during and after the flash removal operation is shown with relation to FIGURES 8 through 11.

Figure 8:
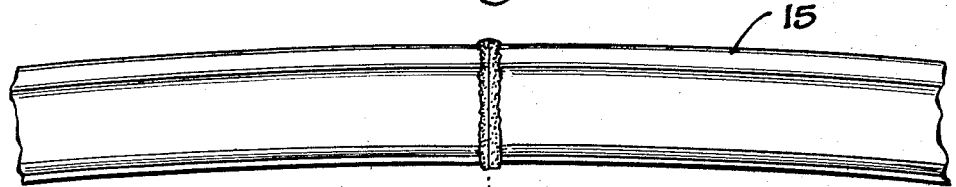
FIGURE 8 illustrates the domed condition of the rail as it is received within the flash removal machine.

The section shown in FIGURE 8 is generally indicative of the domed rail joint area after welding and as received within the flash removal machine. Removal of the weld flash with the rail joint in this domed condition is not satisfactory. It will be appreciated that a considerable variation in the magnitude of the domed condition will be experienced over a period of time. It would be virtually impossible to predict with any degree of certainty just how the finished joint would appear or how satisfactory it would be for the stringent service to which it will later be put. Some correction of the domed condition must be realized in order to have a reference point about which a flash removal device can be designed.

Figure 9:
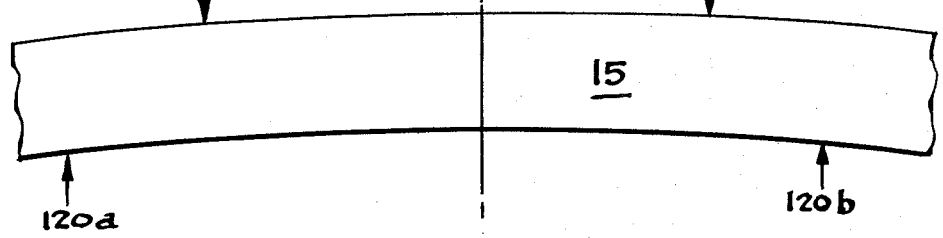
FIGURE 9 is a schematic representation of the coupling forces acting on the domed rail within the machine.

The vertically opposed forces adapted to impress a correction upon the domed condition of the as-received rail are depicted schematically in FIGURE 9. As shown, two downward forces, represented by arrows 76a and 76b are exerted against the rail head to urge the domed rail section 15 downwardly to a lesser degree of convexity. The forces 76a and 76b are applied to the rail at two longitudinally spaced points on the rail, these points being substantially equidistant from the rail joint. The force 76a and 76b are applied to the rail head by the dogs 76 and the cylinder-piston units 76.

It should be appreciated that the adjoining heads of the welded rail joint are seldom in perfect alignment, either vertically or horizontally. As a result, there will be varying degrees of offset of one rail head with respect to the other. This offset must be taken into account in removal of the weld flash from the welded rail joint in order that a satisfactory, smooth joint may be produced. Since the rail joint area may enter the flash removal machine with varying degrees and types of offset, it is necessary to exercise control over the amount of vertical flexure of the rail in preparation for the machining of the rail surface to remove the weld flash.

The rail joint is positioned and clamped within the flash removal machine such that, upon machining of the rail surface, only a thin layer of metal will be removed from the "low" rail head, or the cutter may merely contact the "low" rail head, while a blending cut is realized on the "high" rail head. The amount of metal removed from the "high" rail head therefore is controlled and dependent upon the degree of vertical offset. It should be understood, of course, that there will always be removal of enough metal to fully remove the weld flash from the rail head and to provide a smooth surface.

Positioning and clamping of the rail joint area within the flash removal machine may be done manually or by appropriate sensing devices adapted to sense the rail position within the machine in relation to the path traversed by the machining elements in passing over the rail surface. Vertical positioning of the joint area within the machine is dependent upon the position of the "low" rail head of the adjacent, welded rail joint area. When the "low" rail head reaches a preselected position in relation to the path to be traversed by the machining elements, then the rail joint is clamped and prepared for the machining operation. As noted above, the positioning of the joint area may be done either manually or by automatic means using sensing probes to dictate the positioning of the rail. To establish a predictable and reproducible reference plane for the machine it is essential that there be vertically opposed forces applied to the rail joint area within the machine.

Forces 120a and 120b, schematically shown in FIGURE 9, are applied to the rail base by the flexing rolls 120. The forces 120a and 120b are applied outwardly of the forces 76a and 76b, respectively. The net result is that the vertically opposed forces exerted by the two pairs of flexing rolls 120 and depending dogs 76 are effective to produce a couple on the rail and flex the rail to a lesser degree of convexity.

Figure 10:
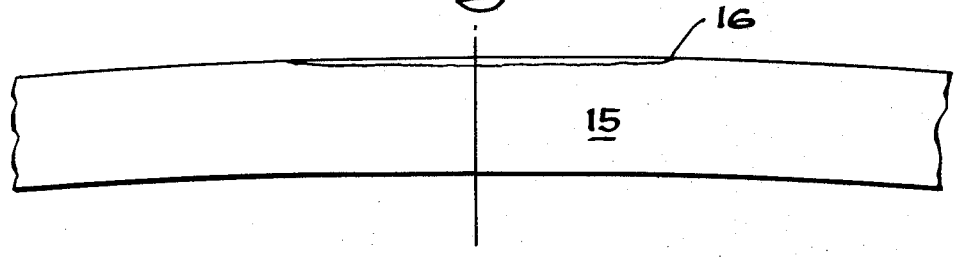
FIGURE 10 is a side plan view of a typical rail after removal of weld flash from the top surface.
Figure 11:
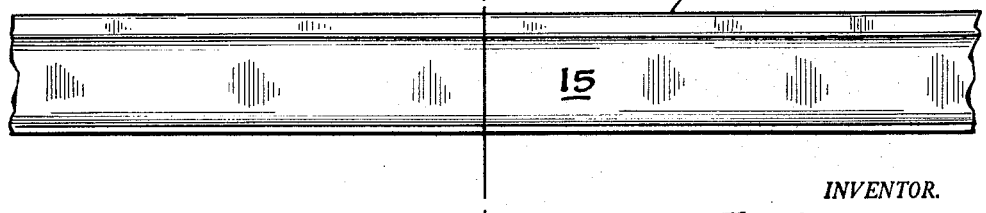
FIGURE 11 is a side plan view indicating the surface condition of the rail after cooling.

When the rail is securely clamped within the machine and the vertically opposed forces applied, removal of the weld flash is initiated by traversing the cutters over the rail joint surface. Depending upon the method of removal (i.e., whether grinding or milling is utilized for removal) the removal of weld flash may be accomplished in one or more passes over the joint area. The top cutters (to be described below) traverse the top face of the rail in a substantially horizontal path across the rail joint to thereby remove material from the top face of the rail in varying thickness, the material removal being at a maximum at the rail joint due to passing of the cutters over the rail joint along a substantially horizontal path with the rail joint area being in the aforementioned domed condition. The general contour of the top surface of the rail 15 after the weld flash has been removed is shown in FIGURE 10. The surface 16 is generated on the top surface of rail 15 after passage of the top cutters thereover. As indicated, a slight removal of the top rail surface is effected longitudinally of the rail on either side of the rail joint in order to assure complete removal of the weld flash at the joint and to provide a smoothly tapering top surface upon final cooling of the rail.

After removal of the weld flash from the rail surfaces the rail 15 is removed from the flash removal machine. Upon cooling the rail will restore itself essentially to a horizontally straight condition, as shown generally in FIGURE 11. The surface 16 of the rail joint, after cooling, is either level with the adjacent rail top surfaces, or may have a slight crown.

A carriage support mechanism 20 is provided as a support and traversing means for the rail flash removal cutters 50 and 57, to be described in detail below. Two horizontal, parallel spaced rails 24 are attached at their terminals to a suitable support means (not shown) which support means is rigidly attached between columns 26, 26a, 28 and 28a, respectively. The carriage 20 is movably mounted on the parallel, spaced rails 24 by a plurality of wheels 30. The wheels 30 are rotatably mounted on axles 30a. The axles 30a are supported at either end by axle support members 36 which members are integrally attached to the carriage frame 20. Lower wheels 32, shown in FIGURE 1, are rotatably mounted on axles 35 positioned at either end of the carriage 20. The axles 35 are supported by subtending brackets 31 which brackets are integrally attached to the carriage 20. The lower wheels 32 are adapted and positioned to move along the under surface of the parallel rails 24 and are included to prevent lifting of the carriage 20 from the rails 24 in the event a force is applied to the carriage 20 at one end thereof of sufficient magnitude to lift the other end of the carriage 20 from the rail surface.

Additional guide wheels 34 (shown in FIGURE 5) may be attached to the carriage 20 to guide the carriage along the rails 24. The wheels 34 are rotatably mounted on axles 37. Axles 37 are suitably mounted in brackets 39 rigidly attached to the side wall of the carriage 20. The guide wheels 34 are positioned in a generally horizontal plane being mounted such that they will ride on the vertical faces of the rails 24 to guide the wheels 30 along the top surface of the rail 24 and thereby prevent the carriage 20 and its associated mechanism from leaving the surface of the rails 24.

The carriage 20 is provided with a worm drive, indicated generally at 22 in FIGURE 1, to provide a convenient motive force for moving the carriage 20 from one terminal of its working position to the other terminal thereof. This worm drive is comprised of a worm screw 21 mounted at each end in the vertical end columns 26 and 28, respectively, by bearing members 23. A gear 25, shown in the cutaway section in FIGURE 1, is non-rotatably positioned on the work gear shaft at a suitable position thereon arbitrarily selected for convenience. A second gear 27 is placed in meshed relation with the gear 25. A motor 29 is drivingly attached to the second gear 27. It is apparent that when the motor 29 is energized to rotate in a predetermined direction, the associated gearing will serve to rotate the worm screw 21. An appropriate stationary threaded gear or collar (not shown) is provided on the carriage 20 so that when the worm screw 21 rotates the gear or collar (not shown) will urge the carriage 20 to move in the appropriate direction along the rails 24.

A horizontal support shaft 38 (FIGURES 1 and 5) is supported on the carriage 20 by the spaced trunnions 40. The trunnions are in the form of L-shaped brackets. One leg 41 of each of the brackets 40 is welded to the face of the carriage 20. The other leg 43 of the brackets 40 is an upstanding vertical leg having bearing portions therein adapted to receive the shaft 38.

Undercutter support arms 42 and side cutter support arms 44 are pivotally received on the shaft 38. A series of spacer sleeves 46 (shown in FIGURE 5) envelop the shaft 38 and hold the support arms 42 and 44 against axial movement along the shaft 38.

A plate 48 is welded to and extends between the undercutter support arms 42 and is provided as a support member for the undercutter, indicated at 50. A pair of parallel upstanding plates 52 are welded to the support plate 48, the plates 52 being contoured on their upper surface to receive the undercutter unit 50 and provide a support therefor.

The support arms 44 have a cross-plate 54 welded thereto on the upper surface of the arms 44. The cross-plate 54 has a dovetail slideway 53 milled in its upper surface, the slideway extending longitudinally of the plate 54 and in a direction of the rails 24.

Support plates 56 are slidably received within the milled slideway 53 in the plate 54 for sliding movement towards and away from each other. The plates 56 support the side cutting units 57 through the medium of the upstanding plates 58 (shown in cross section in FIGURE 5) which plates 58 are welded to the sliding support plates 56 and are affixed to the respective side cutters 57 by any suitable means.

The support plates 56 are positioned longitudinally of the milled slot 53 in the plate 54 by means of a cylinder 62 and spring 64. The cylinder 62 serves to urge the plates 56, and therethrough the side cutters 57, to their extended or greatest spaced relation, relative to each other. The spring 64 serves to bring the plates 56 and therethrough the side cutters 57 into operative position in contact with the sides of the rail 15 from which weld flash is to be removed.

The side cutters are selectively spread to receive the rail 15 therebetween by the spreading action of the hydraulic cylinder-piston assembly 62, FIGURE 5. This assembly is pivotally attached to the respective plates 56 to force the same to spaced position when liquid under pressure is applied to the assembly 62. The spacing thus permitted is sufficient to spread the side or web cutters 57 the amount required to pass the rail 15 with ease. When the liquid pressure is relieved, the slide plates 56 are drawn together by the spring 64, which is similarly pivotally connected at its opposite ends to the plate 56.

The undercutter support arms 42 and hence the support plate 48 and the undercutter unit 50, are vertically adjusted by the hydraulic cylinder-piston unit indicated at 66, FIGURE 1. Piston 66 may be integrally attached to the carriage 20 by any convenient and well-known means. A connecting rod 68 is pivotally attached at one end to the piston 67 of the cylinder-piston assembly 66. The other end of the connecting rod 68 is pivotally attached by a pin 61 to the undercutter support arm 42. Each of the support arms 42 is provided with the cylinder-piston assembly 66 to provide for uniform vertical adjustment of the undercutter support members. When hydraulic fluid under pressure is applied to the cylinder-piston unit 66, the arms 42 are thereby raised, lifting the plate 48 and the undercutter unit 50. Conversely, release of the hydraulic pressure permits the arms 42 to be vertically adjusted downward.

The side cutter support arms 44 are similarly supported by a cylinder-piston unit 70, FIGURE 1, and connecting rod 72. The connecting rod 72 is pivotally connected at one end to the piston of the cylinder-piston unit 70 and at the other end to the side cutter support arms 44. Application of hydraulic fluid under pressure to the cylinder-piston unit 70 serves to raise the support arms 44 through the connecting rods 72. The arms 44 in turn carry the plate 54 to thereby raise the side cutters 57 into operative horizontal relation with the side face of the rail 15. Release of the hydraulic pressure permits the side cutters to be lowered out of operative position.

A suitable and appropriate hydraulic fluid system (not shown) is provided in association with the present invention to supply hydraulic fluid to the cylinders 66 and 70 to thereby permit the operator to adjust the vertical positions of the undercutter and side cutters. Such hydraulic systems are well-known in the art and are not a novel feature of this invention.

The undercutter unit 50 may be driven by an electric motor 51 which motor may be most conveniently mounted at the rear of the unit in driving relation therewith. A gear box 49 is associated with the undercutter 50. The cutting head 55 of the undercutter unit 50 is operatively attached to the front of the gear box 49. The cutting head 55 is preferably a milling type cutter but a grinding head or other means adapted for metal removal may be utilized.

The cutting heads 60 of each of the side cutters 57 are driven by electric motors 58 through an associated gear box 59. The motors 58 are operatively mounted at the rear of the gear boxes 59, as shown in FIGURE 2.

As shown by the dotted lines in FIGURE 3, the undercutter unit 50L is in its normal "rest" position at its extreme left terminal of travel. In this position it is normally withdrawn from rail engaging position and awaiting entry of a welded rail joint within the machine. The position of the undercutter in its extreme right position is depicted by the dotted outline 50R. In this position the undercutter has traversed the rail joint 17, removed the weld flash therefrom at the bottom of the rail, and is ready to be returned to its rest position 50L for the next flash removal operation.

The side cutter is shown in its rest position by the dotted outline 57L (FIGURE 3) in which position it is out of engagement with the rail web. The side cutters are shown in their extreme right position by the dotted outline 57R in which position they have traversed the joint, been removed from engagement with the rail web and are ready to be returned to their rest position 57L for the next flash removal operation.

It should be observed that return of the side and bottom cutters is not essential to effective operation of the machine. It is obvious that a modification could be made whereby the cutters would traverse the rail joint from left to right on one flash removal operation and from right to left of the next subsequent flash removal operation, thereby eliminating the return sequence of the cutters.

A generally horizontal support bar 124 is movably mounted on spaced parallel tracks 126. The parallel track members 126 are rigidly attached to the vertical support members 26, 26a, 28 and 28a, and are disposed in a direction parallel to the horizontal, parallel rails 24. The horizontal support bar 124 is provided with wheels 128 to movably support the bar 124 upon the tracks 126. The wheels 128 are rotatably mounted on the wheel support members 129 which members depend from and are integrally attached to the support bar 124. Guide wheels 130 are rotatably mounted on one end of axial pins 131. The axial pins 131 are integrally attached at their other end to the support bar 124. The guide wheels 130 move along the vertical face of the track members 126 to prevent the wheels 128 and thereby the support bar 124 from being dislodged from the track members 126.

Top cutters 132 are suspended from the support bar 124 by connecting bars 134. Each of the connecting bars 134 is pivotally attached at one end to brackets 135 suspended from and integrally attached to the support bar 124. The other end of each of the connecting bars 134 is pivotally attached to upstanding brackets 137 which brackets are integrally attached to the top cutters, indicated generally at 132. The connecting bars 134 thereby support the top cutters 132 for movement axially with respect to the rail.

An alternate and equally acceptable method of supporting the top cutters 132 and of positioning them with respect to the rail head during the traverse of the cutters 132 over the rail head would involve the inclusion of machined ways as support and guide members. It will readily be seen that machined ways similar to those shown in FIGURES 1 and 3 for the guiding and operative positioning of the side cutters 57 may likewise be employed for the top cutters 132. These machined ways (not shown) would extend laterally of the flash removal machine. A suitable slide may be integrally fastened to the top cutters 132 and adapted to matingly engage said machined way to thereby support and slidably guide the cutters 132. These machined ways may be mounted for movement laterally of the machine so that the cutters 132 could respond to alternative guidance of appropriate cam members.

The cutting heads 133 of the top cutters 132 are driven by electric motors 143 through associated gearing means contained within the gear boxes 141.

Positioned above the support bar 124 and rigidly attached thereto is an internally threaded collar 136. The collar 136 is adapted to threadedly receive a worm drive shaft 138. The worm drive shaft 138 is mounted at either end thereof by suitable bearing members 140. The bearing means 140 are rigidly attached to the vertical support members 26 and 28. A motor 142 is drivingly connected to one end of the worm drive shaft 138 to rotate the shaft and thereby effect movement of the support bar 124. Movement of the support bar 124, of course, results in travel of the top cutters 132 longitudinally of the flash removal machine.

A hydraulic cylinder-piston assembly (not shown) may be substituted for the worm drive mechanism 139 for traversing the top cutters 132 longitudinally of the rail. Such a hydraulic drive mechanism would involve the use of a piston and piston rod assembly for the driving element. The piston rod may be operatively affixed to the top cutter support member so that each movement of the piston rod is duplicated by movement of the top cutter support member and therethrough the top cutters 132.

Guide cams 144, shown in FIGURE 2, are pivotally supported at each end by the connecting rods 146 and connecting pins 147. The connecting rods 146 are attached at their opposite ends to the pistons of the cylinder piston units 148. The cylinder-piston units 148 are pivotally attached to brackets 145. The brackets 145 are integrally attached to the vertical end columns 26, 26a, 28 and 28a. The guide cams 144 and cylinder-piston units 148 are positioned on the vertical end columns 26, 26a, 28 and 28a such that the guide cams 144 lie in a generally horizontal plane immediately adjacent the upper surface of each of the top cutters 132. The cams 144 are disposed on either side of the rail path within the flash removal machine in spaced relation therewith. Cam followers 150 are mounted on the top surface of each of each of the top cutters 132 and are positioned thereon such that they will engage the guide surface of the guide cams 144 to dispose the top cutters 132 into the desired position with respect to the rail head as the cutters traverse the rail joint area. It should be noted that if the pendulus suspension of the top cutters 132 is not sufficient to maintain the cam followers 150 in contact with the guide cams 144 a spring, hydraulic cylinder or other suitable tensioning means of conventional construction may be employed for that purpose. As is shown more clearly in FIGURE 2, the guide cams 144 are designed such that they will position the cutting heads 133 of the top cutters 132 as the cutters 132 are traversed the length of the rail 15 by the worm drive mechanism 139, in continuously changing complementary paths from retracted positions overlaying the rail joint and finally to the retracted positions outboard the rail 15 at one end of travel to active positions outboard the rail at the other end of travel, as seen in the horizontal plane. Travel of the top cutters 132 with relation to the rail surface is depicted in FIGURE 2 where the cutters are shown in solid lines shortly after initiation of the traverse (at the left in FIGURE 2) and in dotted lines 132a at the completion of one pass over the rail joint.

The guide cams 144 are urged into operative position by pistons of the cylinder-piston units 148. The cylinder-piston units 148 are actuated by any suitable fluid power source, such actuating means being well-known in the art. When the pistons of the cylinder-piston units 148 are urged to their fully retracted positions, the guide cams 144, attached thereto, are withdrawn to the position shown generally by the dotted lines (FIGURE 2) and identified by the reference 144a. In this latter position the guide cam 144 maintains the top cutters 132 out of contact with the rail head in all longitudinal positions of the cutters. The guide cams 144 are operatively positioned, with respect to the rail joint area, such that the flange portion 133a of the cutting head 133 of the top cutters 132 will remove only a very small portion of the side surface of the rail head farthest away from the cams 144 (in traversing the rail joint) and makes a suitable blending cut on the side surface of the adjacent offset rail head nearest the cams 144. The cams 144 may be positioned manually or they may be positioned by suitable sensing devices associated with the hydraulic control devices.

The time cycle of an automatic control device that may be utilized in conjunction with the flash removal machine is shown generally in FIGURE 7. The functions are denoted along the vertical axis of the bar graph with the time sequence presented along the horizontal axis. The time sequence is arbitrarily represented by letters of the alphabet, the completed cycle being represented by the letters A through K.

As shown in FIGURE 7, the rail is introduced into the flash removal machine at A and poistioned therein so that the rail joint is approximately in the center of the machine. At time B the dogs 76 are urged into rail receiving position by energization of the piston-cylinder units 78. At the same time interval the flexing rolls 120 lift the rail and are urged into force opposition, with respect to the force exerted by the dogs 76, through energization of the piston-cylinder unit 114. At time interval C the side rail clamps 86 and 88, shown in FIGURE 3, are urged into rail engaging position through energization of piston-cylinder unit 90. At time interval D all of the cutters (bottom cutter 50, side cutters 57, and top cutters 132) are energized through appropriate means. At time interval E the undercutter unit 50 is lifted into rail engaging position by appropriate energization of the piston-cylinder unit 66, the side cutters 57 are lifted into position by appropriate energization of the piston-cylinder unit 70 with the spring 64 urging said cutters into engagement with the rail web, and the top cutters are urged into operative position by appropriate energization of the piston-cylinder units 148. At time interval F the worm drive means 22 and 139 for the undercutter and side cutter traverse the top cutter traverse, respectively, are energized to initiate traversal of the respective cutting mechanisms.

From time interval F to time interval G the rail joint is traversed longitudinally and removal of the flash is effected by the cutting devices, previously described. At time interval G the weld flash has been removed from the rail joint area and the cutters are de-energized. At time interval H the undercutter 50, side cutters 57 and top cutters 132 are moved out of rail engaging position by their associated piston-cylinder units. If there is an excessive amount of weld flash present on the rail joint, it should be noted that more than one pass may be required to effect a complete removal. From time interval H to time interval I the worm drive means 22 and 139 are reversed to return the cutting mechanisms to their original or starting positions, ready for the subsequent rail entry. It should be observed that return of the cutting mechanisms to their original positions is not essential since flash removal can be effected with the cutters traversing the rail joint from either direction. Thus the time interval from H to I can be eliminated from the control sequence if required. At time interval J the top rail and side rail clamps 76, and 86 and 88, respectively, are removed from rail engaging position, and the rail is moved out of the flash removal machine. At time interval K the flash removal operation is complete and the machine ready for entry of the subsequent rail joint.

It should be appreciated that variations of the present inventions other than those specifically described can be incorporated herein such as the employment of hydraulic or fluid motors to drive the cutting heads of the top, side and undercutters, either directly or through gear drives. Further, automatic sensing means may be employed to sense the approach of the rail when lifting the undercutter and side cutters into their operative positions and to automatically stop the flow of fluid to the pistons controlling the vertical positioning of the aforementioned cutters.

The other embodiments and modifications of this invention will suggest themselves to those skilled in the art. All such of these as come within the spirit of this invention are included within its scope as defined by the appended claims.

What is claimed is:

1. The method of removing flash from a hot, welded rail joint, comprising the steps of: exerting moment-producing forces on a rail on each side of a hot, welded rail joint to flex a rail to a pre-selected degree of convexity, and removing flash from at least the top face of the rail along a substantially straight path to remove a varying thickness of the top rail face having a maximum depth at the rail joints, and thereafter releasing the movement-producing forces on the rail to allow the rail to straighten during cooling of the rail joint.

2. The method of removing flash from a welded rail joint, comprising the steps of: exerting moment-producing forces on each side of a welded rail joint while the rail is still in heated convexed condition following weld to flex the rail to a preselected degree of convexity, removing flash from at least the top face of the rail along a substantially straight path to remove a varying thickness of the top rail face having a maximum depth at the rail joint, and thereafter allowing the rail to cool to restore itself essentially to the straight condition leaving a smooth surface at the top face of the rail joint.

3. The method of removing flash from a welded rail joint, comprising the steps of: exerting moment-producing forces on a rail on each side of a rail joint, while the rail is still in heated convexed condition following welding, to flex the rail to a greater degree of convexity, removing flash from at least the top surface of the rail along a substantially straight path to remove a varying thickness of the top rail face having a maximum depth at the rail joint, and thereafter allowing the rail to cool to restore itself essentially to the straight condition leaving a smooth surface at the top face of the rail joint.

4. In a machine for removing flash from a hot, welded rail joint: means engageable with a welded rail for flexing the rail longitudinally about the hot rail joint to a preselected degree of convexity, said machine having means movable longitudinally along a substantially straight path for removing flash from the rail joint while the rail is flexed by said flexing means to the preselected degree of convexity, and means for deactuating said flexing means to allow the rail to cool to restore itself to the essentially straight condition.

5. In a machine for removing flash from a hot, welded rail joint: means engageable with a welded rail for flexing the rail longitudinally about the hot rail joint to a greater degree of convexity, said machine having means movable longitudinally along a substantially straight path for removing flash from the rail joint while the rail is flexed by said flexing means to the greater degree of convexity, and means for deactuating said flexing means to allow the rail to cool to restore itself to the essentially straight condition.

6. A flash removing machine for welded rails: said machine having force-producing elements effective to engage the top and bottom faces of the rail to produce cooperating couples to flex the rail longitudinally to a preselected reference curvature, means effective to urge the force-producing elements in direction to exert said couples in unison, substantially staright longitudinally extending rail means, machining elements supported by and movable longitudinally along said rail means, said machining elements being effective to remove material from the top face of the rail joint, means to position said machining elements in adjacent but non-cutting relation to the rail joint and at a distance from the rail joint, and means to move said machining elements along said rail means and across the welded rail joint to remove a varying thickness of the top rail face of the rail joint having its maximum depth at the rail joint.

7. A flash removing machine for welded rails: said machine having force-producing elements effective to engage the top and bottom faces of a rail, said force-producing elements including a bottom-engaging element intermediate the top engaging elements to produce cooperating couples to flex the rail longitudinally in an upwardly convex direction, means effective to urge the force-producing elements in direction to exert said couples in unison and thereby increase the upward convexity of a rail extending between said support elements, substantially straight rail means extending between said spaced support elements, machining elements supported by and longitudinally movable along said rail means, said machining elements being effective to remove material from the top face of the rail joint, means to position said machinng elements in adjacent but non-cutting relation to the rail joint and at a distance from the rail joint, and means to move said machining elements along said rail means and across the welded rail joint to remove a varying thickness of the top rail face of the rail joint having its maximum depth at the rail joint.

8. A flash removing machine for welded rails comprising in combination: spaced support elements adapted to receive the rail with the welded joint intermediate the same, said support elements each having a pair of cooperating force producing elements effective to engage the top and bottom faces of the rail, the bottom-engaging elements being outboard the top engaging elements to produce cooperating couples tending to flex the rail in downwardly convex direction; means effective to urge the force producing elements in direction to exert said couples in unison and thereby reduce the upward convexity of a rail extending between said support elements; horizontal rail means extending between said spaced support elements; rail machining elements supported by and horizontally movable along said horizontal rail means, said machining elements being effective tto remove material from the top face of the rail; means to position said machining elements at the top face of the rail in adjacent but non-cutting position in relation thereto and at predetermined distance from the rail joint; and means to move said machining elements along the rail means and across the welded rail joint to remove a varying thickness of the top rail face having its maximum depth at the rail joint.

9. A flash removing machine for welded rails comprising in combination: spaced support elements adapted to receive the rail with the welded joint intermediate the same, said support elements each having a pair of cooperating force producing elements effective to engage the top and bottom faces of the rail, the bottom-engaging elements being outboard the top engaging elements to produce cooperating couples tending to flex the rail in downwardly convex direction; means effective to urge the force producing elements in direction to exert said couples in unison and thereby reduce the upward convexity of a rail extending between said support elements; horizontal rail means extending between said spaced support elements; a carriage on said horizontal rail means; rail machining elements suported by said carriage, said machining elements being effective to remove material from the top face of the rail; means to position said machining elements at the top face of the rail in adjacent but non-cutting position in relation thereto and at predetermined distance from the rail joint; and means to move said machining elements along the rail means and across the welded rail joint to remove a varying thickness of the top rail face having its maximum depth at the rail joint.

10. The machine of claim 9 in combination with horizontal positioning and support means adapted to receive the rail with the rail joint intermediate the same, said horizontal positioning means being effective to engage the side faces of the rail and to position the rail along substantially the longitudinal axis of said machine.

11. The method of removing flash from a welded rail joint characterized by the steps of: placing the rail, while still in heated, domed condition following weld, with the joint in straddled relation to force-producing elements; urging the force-producing elements in moment-producing direction and in unison to flex the rail to a lesser degree of convexity but not to the straight condition; machining the top face of the rail on a substantially horizontal line across the rail joint, thereby removing a varying thickness of the top rail face having its maximum depth at the rail joint; and thereafter allowing the rail to cool to restore itself essentially to the horizontally straight condition and leave a smooth rail surface at the rail joint.

12. The method of removing flash from a welded rail joint characterized by the steps of: placing the rail, while still in heated domed condition following weld, with the joint in straddled relation to force-producing elements; urging the force-producing elements in a moment-producing direction and in unison to flex the rail to a lesser degree of convexity but not to the straight condition; machining the top face and side faces of the rail by traversing top and side face machining devices along a substantially horizontal line across the rail joint, thereby removing a varying thickness of the top rail face having its maximum depth at the rail joint, removing a varying thickness of the top face of the rail base having maximum depth at the rail joint, and removing the under side of the rail head in varying thickness having minimum depth at the rail joint; and thereafter allowing the rail to cool to restore itself essentially to the horizontally straight condition leaving a smooth surface at the top face of the rail joint.

13. The method of removing flash from a welded rail joint characterized by the steps of: placing the rail, while still in heated domed condition following weld, with the joint in straddled relation to pairs of force-producing elements, each pair being effective to produce a couple on the rail tending to flex the same to a lesser degree of convexity; urging the force-producing elements in moment-producing direction and in unison to flex the rail to a substantially lesser degree of convexity, but not to the straight condition; machining the top face of the rail by traversing top face machining elements along a substantially horizontal line across the rail joint, thereby removing a varying thickness of the top rail face having its maximum depth at the rail joint; and thereafter allowing the rail to cool to restore itself essentially to the horizontally straight condition leaving a smooth surface at the top face of the rail joint.

14. The method of removing flash from a welded rail joint characterized by the steps of: placing the rail joint, while still in heated domed condition following weld, in straddled relation to pairs of force-producing elements; urging the force-producing elements in moment-producing direction and in unison to flex the rail to a lesser degree of convexity but not to the straight condition; machining the top face of the rail by traversing a pair of machining devices having conical machine elements extending towards the rail from each side thereof, the machining devices being moved in a substantially horizontal line lengthwise of the rail and across the rail joint as seen in vertical plane and in complementary paths from retracted positions outboard the rail at one end of travel to active positions overlying the rail in overlapping relation at the rail joint, and finally to the retracted positions outboard the rail at the other end of travel, as seen in horizontal plane, thereby cutting a varying thickness at the top rail face having its maximum depth at the rail joint; and thereafter allowing the rail to cool to restore itself to the horizontally straight condition and leave a smooth surface at the rail joint.

15. A flash removing machine for welded rails comprising in combination: spaced support elements adapted to receive the rail with the welded joint intermediate the same, said support elements each having a pair of cooperating force producing elements effective to engage the top and bottom faces of the rail, the bottom-engaging elements being outboard the top engaging elements to produce cooperating couples tending to flex the rail in downwardly convex direction; means effective to urge the force producing elements in direction to exert said couples in unison and thereby reduce the upward convexity of a rail extending between said support elements; horizontal rail means extending between said spaced support elements; a carriage on said horizontal rail means; rail machining elements supported by said carriage, said machining elements being effective to remove material from the top face of the rail; means to position said machining elements at the top face of the rail in adjacent but non-cutting position in relation thereto and at predetermined distance from the rail joint; means to move said machining elements along the rail means and across the welded rail joint to remove a varying thickness of the top rail face having its maximum depth at the rail joint; and means to guide the rail machining elements across the top face of the rail in complementary paths from retracted positions spaced from the rail joint at one end of travel to active positions overlaying the rail in overlapping relation at the rail joint, and finally to the retracted positions spaced from the rail joint at the other end of travel.

16. A flash removing machine for welded rails comprising in combination: spaced support elements adapted to receive the rail with the welded joint intermediate the same, said support elements each having a pair of cooperating rail engaging elements effective to engage the top and bottom faces of the rail, the bottom-engaging elements being outboard the top engaging elements to produce cooperating couples tending to flex the rail in downwardly convex direction; means effective to urge the rail engaging elements in direction to exert said couples in unison and thereby reduce the upward convexity of a rail extending between said support elements; horizontal rail means extending between said spaced support elements; a carriage on said horizontal rail means; rail machining elements supported by said carriage, said machining elements being effective to remove material from the top face of the rail; means to position said machining elements at the top face of the rail in adjacent but non-cutting position in relation thereto and at predetermined distance from the rail joint; means to traverse the machining elements across the rail joint; and substantially V-shaped guide means to guide the rail machining elements across the top face of the rail in complementary converging paths approaching the rail joint, in overlapping relation at the rail joint, and in complementary diverging paths away from the rail joint.

17. A flash removing machine for welded rails comprising in combination: spaced support elements adapted to receive the rail with the welded joint intermediate the same, said support elements each having a pair of cooperating force producing elements effective to engage the top and bottom faces of the rail, the bottom-engaging elements being outboard the top engaging elements to produce cooperating couples tending to flex the rail in downwardly convex direction; means effective to urge the force producing elements in direction to exert said couples in unison and thereby reduce the upward convexity of a rail extending between said support elements; horizontal rail means extending between said spaced support elements; rail machining elements supported by and horizontally movable along said horizontal rail means, said machining elements being effective to remove material from the top face of the rail; means to position said machining elements at the top face of the rail in adjacent but non-cutting position in relation thereto and at predetermined distance from the rail joint; means to move said machining elements along the rail means and across the welded rail joint to remove a varying thickness of the top rail face having its maximum depth at the rail joint; a second horizontal rail means below said welded rail; a carriage supported by and horizontally movable along said second horizontal rail means; additional rail machining elements supported by said carriage and adapted when elevated to be active against the rail surface; means provided on said carriage and effective to elevate said additional rail machining elements into rail engaging position; and means to move said carriage along said second horizontal rail means and across the welded rail joint.

18. A flash removing machine for welded rails comprising in combination: spaced support elements adapted to receive the rail with the welded joint intermediate the same, said support elements each having a pair of cooperating rail engaging elements effective to engage the top and bottom faces of the rail, the bottom-engaging elements being outboard the top engaging elements to produce cooperating couples tending to flex the rail in downwardly convex direction; means effective to urge the rail engaging elements in direction to exert said couples in unison and thereby reduce the upward convexity of a rail extending between said spaced support elements; rail machining elements supported by and horizontally movable along said horizontal rail means, said machining elements being effective to remove material from the top face of the rail; means to position said machining elements at the top face of the rail in adjacent but noncutting position in relation thereto and at a predetermined distance from the rail joint; means to move said machining elements along the rail means and across the welded rail joint to remove a varying thickness of the top rail face having its maximum depth at the rail joint; means to guide the rail machining elements across the top face of the rail in complementary paths from retracted positions horizontally and longitudinally spaced from the rail joint at one end of travel to active positions overlaying the rail in overlapping relation at the rail joint, and finally to the retracted positions horizontally and longitudinally spaced from the rail joint at the other end of travel; a second horizontal rail means below said welded rail; a carriage supported by and horizontally movable along said second horizontal rail means; additional rail machining elements supported by said carriage and adapted when elevated to be active against the rail surface; means provided on said carriage and effective to elevate said additional rail machining elements into rail engaging position; and means to move said carriage along said second horizontal rail means and across the welded rail joint.

19. A flash removing machine for welded rails comprising in combination: spaced support elements adapted to receive the rail with the welded joint intermediate the same, said support elements each having a pair of cooperating force producing elements effective to engage the top and bottom faces of the rail, the bottom-engaging elements being outboard the top-engaging elements to produce cooperating couples tending to flex the rail in downwardly convex direction; means effective to urge the force producing elements in direction to exert said couples in unison and thereby reduce the upward convexity of a rail extending between said support elements; horizontal positioning and support means adapted to receive the rail with the welded rail joint intermediate the same, said horizontal positioning means being effective to engage the side faces of the rail and to position the rail along substantially the longitudinal axis of said machine; horizontal rail means extending between said spaced support elements; rail machining elements supported by and horizontally movable along said horizontal rail means, said machining elements being effective to remove material from the top face of the rail; means to position said machining elements at the top face of the rail in adjacent but noncutting position in relation thereto and at predetermined distance from the rail joint; and means to move said machining elements across the welded rail joint to remove a varying thickness of the top rail face having its maximum depth at the rail joint.

20. The method of removing flash from a welded rail joint, characterized by the steps of: exerting moment-producing forces on a rail on each side of a welded rail joint, while the rail is still in heated convexed condition following welding, to flex the rail to a lesser degree of convexity but not to the straight condition; machining the top face of the rail along a substantially straight line to remove a varying thickness of the top rail face having a maximum depth at the rail joint; and thereafter allowing the rail to cool to restore itself essentially to the straight condition leaving a smooth surface at the top face of the rail joint.

References Cited by the Examiner
UNITED STATES PATENTS

| | | | |
|---|---|---|---|
| 1,446,095 | 2/1923 | Karaus | 29—555 |
| 2,272,737 | 2/1942 | Chapman. | |

WILLIAM W. DYER, Jr., *Primary Examiner.*